Figure 1:
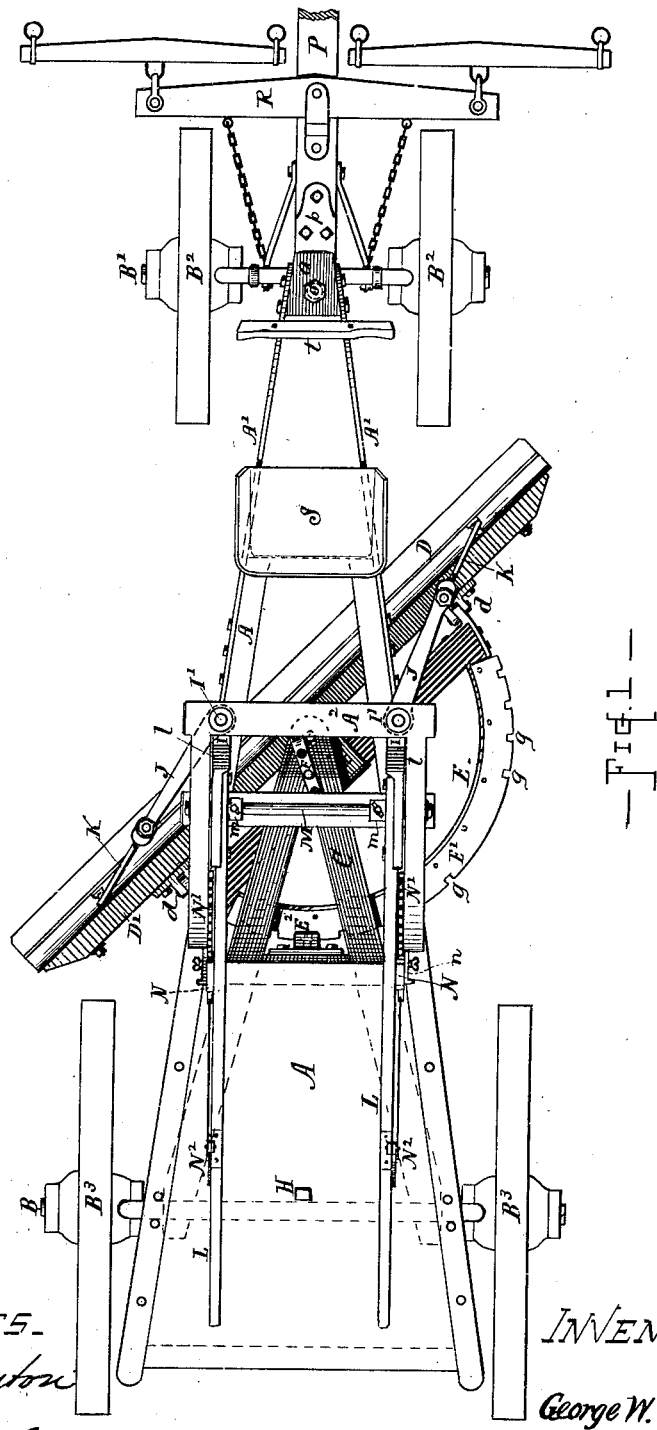

(No Model.) 4 Sheets—Sheet 1

G. W. TAFT.
MACHINE FOR MAKING AND REPAIRING ROADS.

No. 276,093. Patented Apr. 17, 1883.

WITNESSES
INVENTOR
George W. Taft
By Chas. H. Burleigh
Atty.

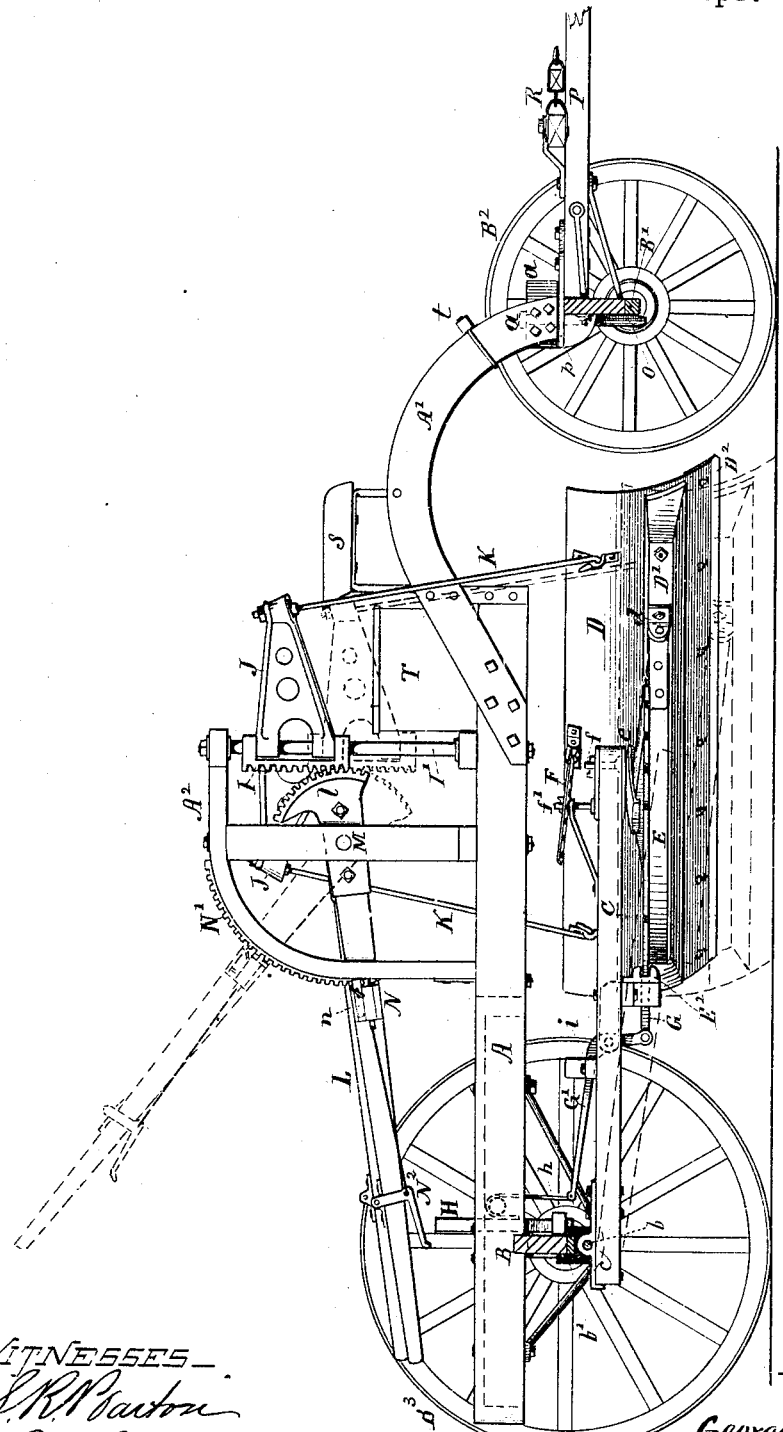

(No Model.) 4 Sheets—Sheet 3.
G. W. TAFT.
MACHINE FOR MAKING AND REPAIRING ROADS.
No. 276,093. Patented Apr. 17, 1883.
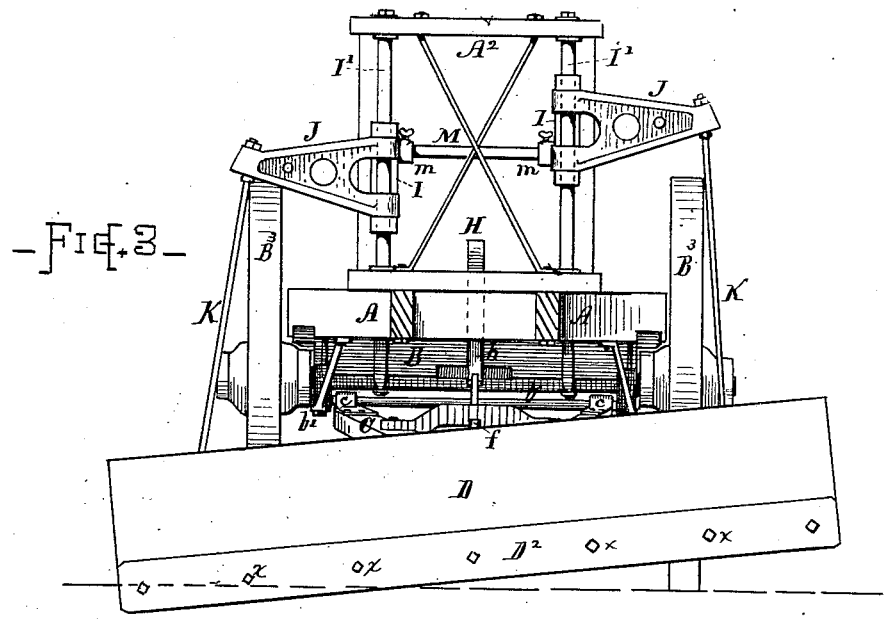
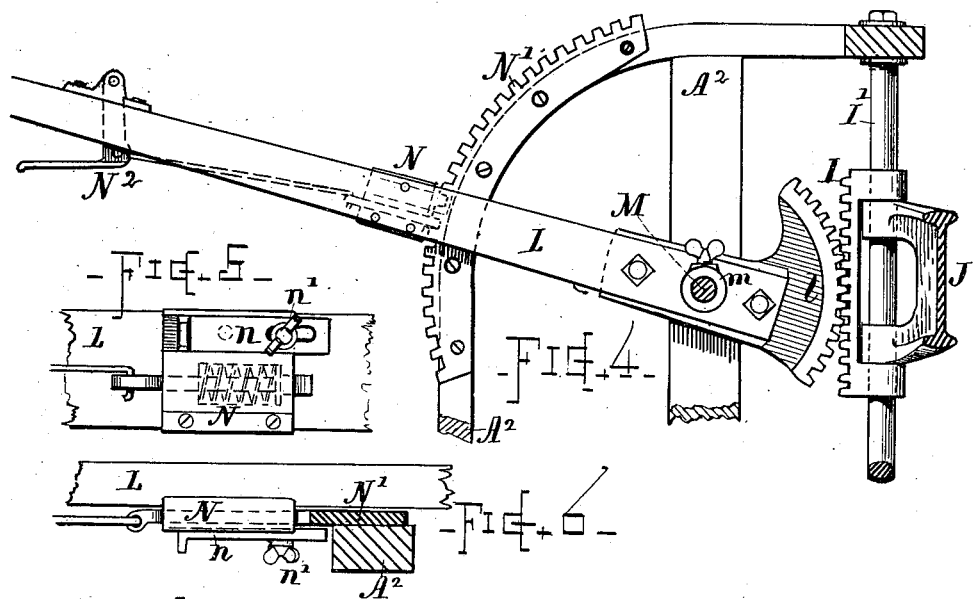
WITNESSES
S. R. Barton
Geo. M. Rice 2d
INVENTOR
George W. Taft
By Chas. H. Burleigh
Atty (No Model.)  G. W. TAFT.  4 Sheets—Sheet 4.
MACHINE FOR MAKING AND REPAIRING ROADS.
No. 276,093.  Patented Apr. 17, 1883.
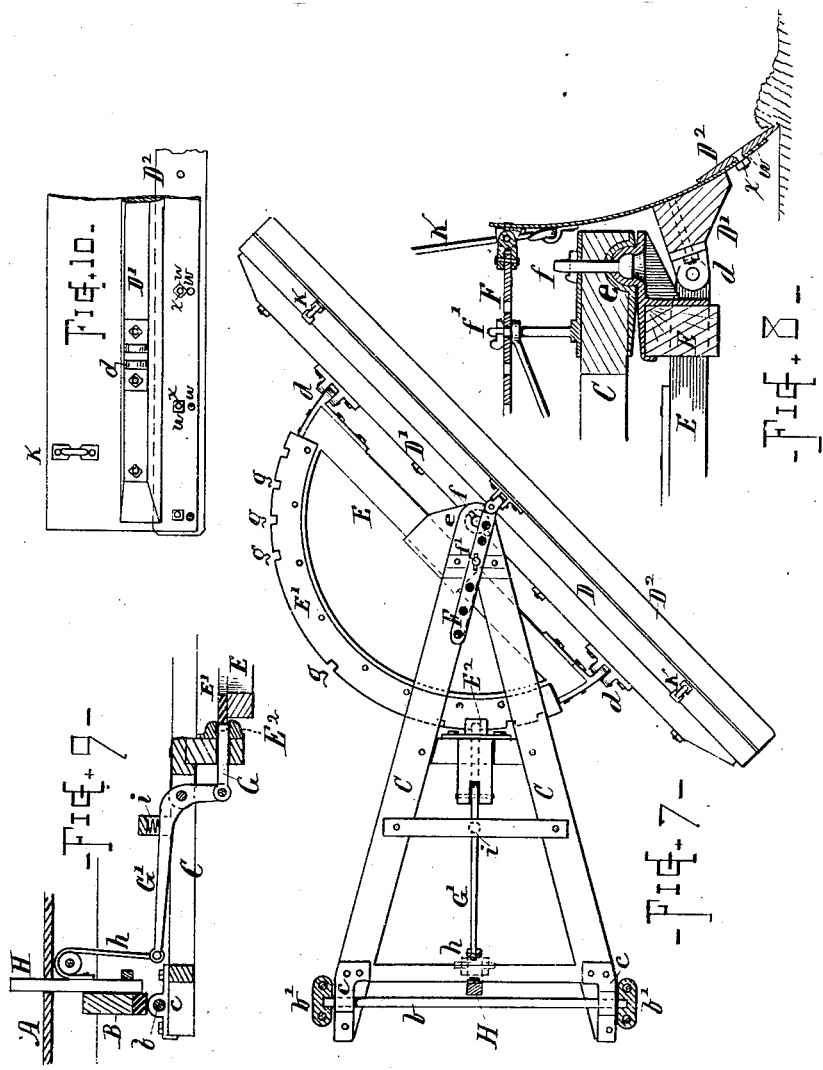
Witnesses.
S. R. Barton
Geo. M. Rice 2d
Inventor_
George W. Taft
By Chas. H. Burleigh
Atty

UNITED STATES PATENT OFFICE.

GEORGE W. TAFT, OF ABINGTON, CONNECTICUT.

MACHINE FOR MAKING AND REPAIRING ROADS.

SPECIFICATION forming part of Letters Patent No. 276,093, dated April 17, 1883.

Application filed October 2, 1882. (No model.)

*To all whom it may concern:*

Be it known that I, GEORGE W. TAFT, of Abington, in the county of Windham and State of Connecticut, have invented certain new and useful Improvements in Machines for Making and Repairing Roads; and I declare the following to be a description of my said invention sufficiently full, clear, and exact to enable others skilled in the art to which it appertains to make and use the same, reference being had to the accompanying drawings, which form a part of this specification.

My invention relates to certain improvements in road-making machines, more especially to that class known as "wagon-scrapers," and wherein the scraping apparatus is mounted and combined with a wheeled platform, wagon, or traveling carriage, upon which is arranged the blade-adjusting mechanism, and whereon the driver and attendant take position and ride while operating the machine.

The objects of my invention are to afford means in a wagon or mounted road-machine for the angular adjustment of the scraping-blade both to right and left horizontal inclination and to any desired degree of inclination; to afford means for the angular adjustment of the blade vertically, or the independent elevation or depression of the respective ends of the blade; to provide a vibrating supporting-frame for sustaining the blade in position from its rear side, and for transmitting the strain to the rear axle or back portion of the body-frame, and also for permitting the elevation and depression of the blade in relation to the wagon-body or main frame, while resisting all tendencies to lateral movement; to provide convenient actuating devices for regulating and adjusting the scraping mechanism, and for locking and releasing the parts at their several positions of adjustment; to perfect the general construction and arrangement of mechanism, so as to produce a practical and efficient apparatus that can be worked with facility, convenience, and economy, and either at the right or left hand side of the roadway—one which is adapted to meet the requirements of service and do good work under all the various circumstances and conditions incident to actual usage in road-making. These objects I attain by mechanism the nature of which is illustrated in the accompanying drawings and herein described, the particular subject-matter claimed being hereinafter definitely specified.

In the drawings, Figure 1 is a plan view of a road-machine embracing the features of my invention. Fig. 2 is a side view of the same, the near wheels being omitted on the drawings and their axles shown in section. Fig. 3 is a transverse vertical section forward of the blade, showing the parts at position of transverse adjustment and with one end of the blade at higher elevation than the other. Fig. 4 is a detail view of one of the elevating-levers and its locking devices on a somewhat larger scale. Fig. 5 is a side view of the lever-locking device on larger scale. Fig. 6 is a plan view of the same, with a section of the ratchet-plate and frame. Fig. 7 is a plan view of the hinged thrust-frame and its attachments for carrying and adjusting the scraping-blade or plow. Fig. 8 is a central vertical section through the blade and its pivotal connections, drawn to a larger scale. Fig. 9 is a detail view of the locking and releasing devices for controlling the horizontal angular adjustment of the blade. Fig. 10 is a rear view of a portion of the scraper and its re-enforce, showing the manner of connecting the parts.

In reference to the drawings, A denotes the body or wagon-platform, mounted on axles B B', and provided with traveling wheels B² B³, as indicated. The forward end of the body-frame tapers inward, and is made with arched irons A', that connect with the rocker or pintle-block $a$, and which allow of the forward wheels, B², swinging beneath the frame, so as to permit the turning of the team in short compass.

C indicates a triangular frame, hinged at its rear end in connection with the body-frame, or preferably to the rear axle, B, in a manner to permit the vertical adjustment or elevation and depression of its forward end, to which is connected the scraper or earth-blade D, said blade being attached to the apex of the frame C in a manner to give free adjustment in any desired direction, and so that the thrust of the frame will hold the blade to its work. The frame C is in the present instance composed of two converging side pieces joined at their forward extremities, and connected centrally and near their rear ends by suitable transoms or cross-pieces. At the rear angles hinge-castings c c connect the frame to a bar, b, that extends along the rear axle, B, and has its ends firmly secured by the castings or brace-mountings b', that serve to connect the axle and main body-frame A, thus forming a secure but flexible connection between the main body A and the blade-supporting frame C, which is rigid against lateral movement and rearward pressure, but which will permit vertical movement of the forward end of said frame C for elevating and depressing the blade D.

The blade D is preferably formed of a curved plate of steel or iron, having a stiffening-bar, D', attached to its rear side. This is connected by hinges d to a semicircular frame or supporter E, that is in turn pivoted to the forward end of the vertically-swinging frame C, as illustrated, the connecting-joint or pivot-bearing being made with a ball and socket, e, (see Fig. 8,) so as to permit the elevation and depression of the respective ends of the blade D when said blade is at any position of angular adjustment. The ball and socket are formed by castings attached to the frames C and E, and the pivot-bolt f passes up through said castings, and may be secured by a key, a nut, or in other suitable manner.

The lower edge of the blade D is re-enforced with a steel plate, D², the attaching-studs x being arranged at the central line of the steel, and two series of holes, w, (see Figs. 8 and 10,) being formed in the blade D at the distance of about one inch apart. Thus when the edge of the steel re-enforce D² becomes worn away, say, one inch, it can be lowered one inch by changing the bolts x to the lower holes w. Then when it becomes worn away another inch it can be reversed, the top edge being placed downward, and two inches of stock may in similar manner be worn away from that edge of the steel, so that four inches of the width of a six-inch steel plate can be worn away before renewal of the re-enforce plate is required. This is of considerable importance in the economic maintenance of the machine when in use.

The blade D is held at forward or backward adjustment by means of a perforated bar, F, connected by a universal or double-hinge joint to the upper edge of the blade, and adapted to lock onto a stud, f', on the upper side of the frame C, as illustrated; or the blade may be otherwise adjustably connected to said frame.

The semicircular frame E is provided with a segment-flange, E', that works through a guiding-casting, E², fixed on the transom of frame C, said flange E' being provided with suitable recesses, g, to receive the end of a locking-bolt, G, arranged within the casting E², and by means of which the semicircular supporting-frame E is locked for retaining the blade D at its various positions of right or left horizontal angular adjustment.

The locking-bolt G is operated by means of an angle-lever, G', fulcrumed on the frame C, with its rear end connected by a strap or chain, h, passing over a suitable guide-pulley, h', to a foot pin or pedal, H, that projects through the platform A in position to be conveniently depressed by the attendant, who can, by placing his foot upon the end of said pin, readily withdraw the bolt G and release the blade D for changing its relative adjustment when required. A spring located at i, above the lever G', serves to press forward the locking-bolt G, and to elevate the foot-pedal H when pressure thereon is removed.

Above the platform or wagon-body A, and rigidly fixed thereon, is an upright frame, A², supporting vertical guide-standards I', on which are arranged sliding racks I, carrying arms or cranes J, to the outer ends of which the respective ends of the blade D are suspended by means of the rods K, the upper ends of which are loosely retained in sockets on the ends of the cranes J by nuts or other suitable means, while their lower ends are hooked into loops on the rear side of the blade, as at k, or the parts otherwise attached in a manner to permit freedom of action.

The racks I and cranes J are made with independent connections on the guides I', so that the cranes can be swung around while the racks remain in position; but said parts are arranged so that any vertical movement of the racks I will cause a corresponding movement of the cranes J, rods K, and blade D. Said cranes could, if desired, be hinged on the sides of the racks I; but I prefer the construction shown. The cranes support the weight of the blade D and its connections, concentrating the strains at the axial points of the cranes, and thereby reducing the friction, and permitting the free and easy swinging action of the mechanism when changing the angular adjustment of the blade from right to left inclination, while maintaining the points of support in proper relation to the part supported.

Operating-levers L, fulcrumed on a cross-shaft, M, and having segment-gear heads l, are combined with the racks I for effecting the elevation and depression of the cranes and blade. Said levers L extend back over the platform A in convenient positions to be manipulated by the attendant. Locking devices N are arranged on the levers L for engaging with recessed segments or ratchets N' on the frame A² for securing the parts at any desired position of adjustment. In addition to the locking-bolt that retains the adjustment of the lever, and which is operated by the hand-piece N², the lock-plate is furnished with a slotted sliding bolt, n, that is supported in a groove on said plate, and retained by a set-screw, n', (see Figs. 5 and 6,) which bolt is thrust past the edge of the ratchet-plate N' and serves to retain the lever L laterally, and acts as a guide for the lever L against the ratchet-plate N'. The levers L are retained on their fulcrum-shaft M by collars m, or otherwise, in such manner that, when desired, the collars can be loosened, and the geared ends l can be slipped out or unmeshed from the racks I and their teeth remeshed at different position in relation to the teeth of the racks, thus changing the relative working height of the levers L and cranes J, and enabling the attendant to arrange the levers at a convenient location for handling, whether working the blade at relatively high or low position, or for accommodating a tall or short person as attendant. This change can be accomplished in the present instance by loosening the set-screws of the collars $m$ and sliding the levers sidewise on the shaft M, the bolt $n$ being previously slipped back to release the lever from the ratchet-flange N'.

By means of the levers L the attendant, while standing on the platform A, can raise and lower the cranes J, or either one of them, for regulating and adjusting the working height of the blade D, and for raising or depressing either end of said blade to cause it to take a greater or less quantity of earth or to give greater or less inclination to the shoulder of the road. The swinging of the cranes J also permits the easy adjustment of the blade to right or left inclination, so that the machine can be worked with equal facility at either side of the roadway and in either direction for moving the earth toward the center of the road. This feature of right and left adjustment of the blade in relation to the wagon-body is of importance in the construction of roads on the sides of hills and inclined places, where the mass of earth is wholly at one side of the way, as it enables the machine to remove the earth while the team is traveling downhill, whether the earth is to be moved toward the right or left, thus accomplishing results with less labor and with less strain on the team than with machines the blade of which is fixed to working with an inclination to one side only, while it also allows for leveling off the surface of the road by the blade set transversely while the team is returning up the hill. It also permits of working the blade at such an angle as will effect the removal and distribution of earth in the most economical manner, according to the variety of soil and circumstances attending the particular location where the operation takes place.

The body is connected to the forward axle, B', by a king-bolt or pintle, $o$, that passes through the block $a$ and tongue-plate P, and extends down at the back of the axle in such manner that it serves for retaining the tongue P elevated from the ground, while permitting the irregular rise and fall of the ends of the axle B' as the wheels pass over inequalities of surface. The tongue P is of ordinary construction, and is fitted with cross-bar and whiffletrees R and the usual appliances for the attachment of horses or cattle. S denotes a seat for the driver, above the arch-frame A', and $t$ indicates a cross-bar or rest for the driver's feet. A tool-box, T, may be mounted in rear of the driver's seat, as shown in Fig. 2.

In Fig. 2 the blade is shown in full lines as elevated or in position for traveling; but when at work the blade and its sustaining-frame C are lowered, as indicated by dotted lines or as shown in Fig. 3.

When in use a sufficient team is hitched to the tongue P, the attendant takes position on the platform, and the machine is drawn along the roadway to plow or move the earth from the gutters to the crown of the road, or as required, the attendant controlling and adjusting the blade as may be necessary to effect the desired result.

I am aware that road-machines have heretofore been made in which the scraper can be worked at both right and left inclination, and that a machine has been heretofore patented in which the scraper-blade is attached to the forward end of a V-shaped frame located in front of the rear axle of the carriage, and in which the ends of the blade are suspended by rods from vertically-swinging angle-levers mounted on a bed or turn-table centrally pivoted to the body of the carriage for rotative action. I do not therefore herein make claim, broadly, to a scraper-blade supported from the rear, or to the suspension of the blade from a movable bed or turn-table for permitting angular adjustment thereof.

What I claim as of my invention, and desire to secure by Letters Patent, is—

1. In a road-machine, the combination of a supporting wagon or body mounted on wheels, a vertically-swinging frame hinged at its rear end beneath said body, a scraper or blade hinged to a semicircular support-piece pivoted to the forward part of said frame, a pair of independently-supported swinging cranes or arms vertically adjustable on guides or supports mounted on said body and suitably connected for the suspension of the respective ends of said blade, and means for the independent elevation or depression of said cranes, and for the retention of the parts at their several positions of adjustment, substantially as and for the purpose set forth.

2. The combination of the scraper or blade D, the swinging arms or cranes J, arranged for independent elevation and depression at their supports, and the suspension rods or chains K, connecting said blade and cranes, substantially as set forth.

3. The combination of the vertically-swinging frame C, the scraper or blade supported on said frame and pivoted for angular adjustment, the vertically-adjustable swinging cranes J, connected to said blade by suspension rods or chains, and means for securing the parts at their positions of adjustment, substantially as set forth.

4. The combination of the scraper or blade D, the adjustable swinging arms or cranes J, the connections K, suspending said blade from said arms, the racks I, and the operating-levers L, or means for independently elevating and depressing said cranes and the respective ends of said blade, as set forth.

5. The combination, with the body-frame A, of the upright frame A², supporting the guidebars I', and recessed segments N', the movable racks I and swinging cranes or arms J, adjustable on said guides, the hand-levers L, fulcrumed at M, and having segment-geared heads l, meshing with said racks, and the lever-locking devices N, substantially as and for the purposes set forth.

6. The combination of the frame C, adapted for vertical adjustment, the semicircular frame E, pivoted thereto for horizontal rotative adjustment, and the blade D, hinged to said semicircular frame for backward and forward inclination, and means for securing said parts at their respective positions of adjustment, as set forth.

7. The combination, with the scraper or blade D, adapted for horizontal angular adjustment, of the recessed segmental flange E', the locking-bolt G, angle-lever G', and foot-piece H, substantially as and for the purpose set forth.

8. The combination, with the frame C and rotatively-adjustable blade-supporting frame E, of a ball and-socket pivotal connection e, for the purpose set forth.

9. The guide-piece E² for the lock-bolt, provided with lugs for embracing the flange E', in combination with the frame C, semicircular frame E, and blade D, as and for the purpose set forth.

10. The combination, with the vertically-adjustable frame C, the horizontally-adjustable frame E, pivoted thereto, and the blade D, hinged, as at d, for backward and forward inclination, of the perforated bar F, connected to said blade by universal joint, and the stud f', or means for adjustably securing said bar, substantially as and for the purpose set forth.

11. The combination, with the hand-levers L, fulcrum-bar M, and segment-flanges N', of retaining-pieces n and the movable collars m, having thumb-screws for releasing said lever and allowing their geared ends l to be unmeshed from the racks I, substantially as and for the purpose set forth.

12. The combination, substantially as described, of the curved metal blade D, provided with a double series of holes, w, and the steel re-enforce D², having centrally-located holding bolts or studs x, adapted and fitted for connection therewith, as set forth, whereby adjustment of said re-enforce to compensate for wear can be effected in the manner specified.

Witness my hand this 14th day of September, A. D. 1882.

GEORGE W. TAFT.

Witnesses:
CHAS. H. BURLEIGH,
GEO. M. RICE.